(12) United States Patent
Canino et al.

(10) Patent No.: US 7,819,100 B2
(45) Date of Patent: Oct. 26, 2010

(54) INTERNAL COMBUSTION ENGINE WITH INTAKE VALVES HAVING A VARIABLE ACTUATION AND A LIFT PROFILE INCLUDING A CONSTANT LIFT BOOT PORTION

(75) Inventors: Gianluca Canino, Orbassano (IT); Luca Gentile, Orbassano (IT); Laura Gianolio, Orbassano (IT); Maria Grazia Lisbona, Orbassano (IT); Francesco Vattaneo, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 428 days.

(21) Appl. No.: 12/000,448

(22) Filed: Dec. 12, 2007

(65) Prior Publication Data

US 2008/0149055 A1    Jun. 26, 2008

(30) Foreign Application Priority Data

Dec. 20, 2006   (EP)   ................................ 06425851

(51) Int. Cl.
*F01L 1/14*   (2006.01)
(52) U.S. Cl. .............. 123/90.48; 123/90.12; 123/90.16; 123/90.44; 123/90.55
(58) Field of Classification Search .............. 123/90.12, 123/90.16, 90.11, 90.13, 90.44, 90.45, 90.46, 123/90.48, 90.49, 90.5, 90.52, 90.55, 90.6
See application file for complete search history.

(56) References Cited

U.S. PATENT DOCUMENTS 5,839,400 A * 11/1998 Vattaneo et al. .......... 123/90.16

FOREIGN PATENT DOCUMENTS

| EP | 0 803 642 B1 | 11/2000 |
| EP | 1500797 A1 * | 1/2005 |
| EP | 1 555 398 B1 | 2/2007 |
| EP | 1 344 900 B1 | 3/2007 |
| EP | 1 653 057 B1 | 3/2007 |

* cited by examiner

*Primary Examiner*—Ching Chang
(74) *Attorney, Agent, or Firm*—Nixon & Vanderhye P.C.

(57) ABSTRACT

An internal combustion engine is equipped with a variable actuation system for the intake valves, including a chamber of fluid under pressure interposed between the intake valve and the respective controlling cam, and a solenoid valve whose opening causes the pressure chamber to discharge such as to determine the rapid closure of the valve by effect of the respective biasing spring means, even when the respective cam would tend to keep the valve open. The variable valve operation system is used in combination with the use of cams controlling the intake valves shaped in such a manner as to give rise to an intake valve lift profile including a boot portion at substantially constant lift.

9 Claims, 7 Drawing Sheets

INTERNAL COMBUSTION ENGINE WITH INTAKE VALVES HAVING A VARIABLE ACTUATION AND A LIFT PROFILE INCLUDING A CONSTANT LIFT BOOT PORTION

BACKGROUND OF THE INVENTION

The present invention relates to multi-cylinder internal combustion engines of the type including:

at least one intake valve and at least one exhaust valve for each cylinder, each provided with respective biassing spring means which bias the valve towards a closed position, for controlling respective intake and exhaust conduits, at least one camshaft, for operating the intake valves and the exhaust valves of the cylinders of the engine, through respective tappets, in which at least each intake valve has a variable actuation, by being controlled by the respective tappet, against the action of said biasing spring means, through the interposition of hydraulic means including a chamber of fluid under pressure, facing a pumping piston connected to the valve tappet, said chamber of fluid under pressure being adapted to be connected through a solenoid valve to a discharge channel, in order to uncouple the variable actuation valve from its respective tappet and to cause the rapid closure of the valve under the action of its respective biasing spring means, and electronic control means for controlling each solenoid valve so as to vary the time and extension of the opening of the variable actuation valve as a function of one or more operating parameters of the engine.

The Applicant has been developing electronically-controlled hydraulic devices of the type specified above, for the variable actuation of engine valves since long. The Applicant also owns various patents and patent applications relating to engines provided with systems of this type. For prompt reference, FIG. 1 of the attached drawings shows in cross-section an engine according to this technology, as described in European patent EP 0 803 642 B1 belonging to the Applicant.

With reference to FIG. 1, the engine shown therein is a multi-cylinder engine, for example an engine with four cylinders in line, including a cylinder head 1.

The head 1 comprises, for each cylinder, a cavity 2 formed on the base surface 3 of the head 1, defining the combustion chamber, into which two intake conduits 4, 5 and two exhaust conduits open. Communication of the two intake conduits 4, 5 with the combustion chamber 2 is controlled by two intake valves 7, of the conventional mushroom-shaped type, each comprising a stem 8 slidably mounted in the body of the head 1.

Each valve 7 is biassed towards the closed position by springs 9 interposed between an inner surface of the head 1 and a valve cup 10. Communication of the two exhaust conduits 6 with the combustion chamber 2 is controlled by two valves 70, again of the conventional type, to which there are associated springs 9 to bias them towards the closed position.

Opening of each intake valve 7 is controlled, in a manner that will be described below, by a camshaft 11 rotatably mounted around an axis 12 within supports of the head 1, and comprising a plurality of cams 14 to operate the intake valves 7.

Each cam 14 that controls an intake valve 7 cooperates with the plate 15 of a tappet 16 slidably mounted along an axis 17 that, in the case of the example illustrated in the document cited above, is directed substantially at 90° with regard to the axis of the valve 7. The plate 15 is biassed against the cam 14 by a spring associated thereto. The tappet 16 comprises a pumping piston 16 slidably mounted within a bush 18 carried by a body 19 of a pre-assembled unit 20, incorporating all the electric and hydraulic devices associated with the operation of the intake valves, according to what will be described in detail below.

The pumping piston 16 is capable of transmitting a force to the stem of the valve 7, in such a manner as to cause the opening of the latter against the action of the spring means 9, through fluid under pressure (preferably oil from the engine lubrification circuit) present in a pressure chamber C which faces the pumping piston 16, and through a piston 21 slidably mounted in a cylindrical body comprising a bush 22 that is likewise carried by the body 19 of the sub-unit 20.

In the known solution illustrated in FIG. 1, the chamber of fluid under pressure C associated to each intake valve 7 may be placed in communication with a discharge channel 23 through a solenoid valve 24. The solenoid valve 24, which may be of any known type appropriate to the function illustrated here, is controlled by electronic control means, diagrammatically illustrated and designated by 25, depending upon signals S indicative of the operating parameters of the engine, such as the position of the accelerator and the number of revolutions of the engine.

When the solenoid valve 24 is open, the chamber C enters into communication with the channel 23, so that the fluid under pressure present in the chamber C flows into that channel and the cam 14 and respective tappet 16 are uncoupled from the intake valve 7, which thus rapidly returns to its closed position under the action of the biasing spring 9. By controlling communication between the chamber C and the discharge channel 23, it is therefore possible to vary at will the time and extension (lift) of the opening of each intake valve 7.

The discharge channels 23 of the various solenoid valves 24 all lead into the same longitudinal channel 26 communicating with pressure accumulators 27, only one of which is shown in FIG. 1.

All the tappets 16 with the associated bushes 19, 18, the piston 21 with the associated bushes 22, the solenoid valves 24 and the relative channels 23, 26 are carried by or formed in said body 19 of the pre-assembled unit 20, to advantage in terms of the speed and simplicity of assembling the engine.

The exhaust valves 70 associated with each cylinder are controlled, in the embodiment shown in FIG. 1, in the traditional manner, by a respective camshaft 28, through respective tappets 29, although in principle, in the case of the document identified above, an application of the hydraulic operating system also to the control of the exhaust valves is not excluded.

Again with reference to FIG. 1, the variable-volume chamber defined inside bush 22 and facing piston 21 (which in FIG. 1 is shown in its minimum volume condition, the piston 21 being in its upper end-of-stroke position) communicates with the chamber of fluid under pressure C through an opening 30 formed in one end wall of bush 22. This opening 30 is engaged by an end prong 31 of the piston 21 in such a manner as to achieve a hydraulic braking action of the movement of the valve 7 in the closing phase, when the valve is close to the closed position, since the oil present in the variable-volume chamber is forced to flow into the chamber of fluid under pressure C passing through the play existing between the end prong 31 and the wall of the opening 30 engaged by it. As well as the communication constituted by the opening 30, the chamber of fluid under pressure C and the variable-volume chamber of the piston 21 communicate with each other through inner passages obtained one-way valve 32 that enables passage of the fluid only from the chamber under pressure C to the variable-volume chamber of the piston 21.

During normal operation of the known engine illustrated in FIG. 1, when the solenoid valve 24 excludes communication of the chamber of fluid under pressure C with the discharge channel 23, the oil present in said chamber transmits movement of the pumping piston 16, imparted by the cam 14, to the piston 21 that controls opening of the valve 7. In the initial phase of the opening movement of the valve, the fluid coming from the chamber C reaches the variable-volume chamber of the piston 21 passing through the one-way valve 32 and further passages that place the inner cavity of the piston 21, which has a tubular shape, in communication with the variable-volume chamber. After a first displacement of the piston 21, the prong 31 leaves the opening 30, so that the fluid coming from the chamber C can pass directly into the variable-volume chamber through the opening 30, now free.

In the opposite movement of valve closing, as was said above, during the final phase the prong 31 enters the opening 30 causing hydraulic braking of the valve, so as to avoid collision of the body of the valve against its seat, for example subsequent to an opening of the solenoid valve 24 that causes the immediate return of the valve 7 to the closed position.

As an alternative to the hydraulic braking device shown in FIG. 1, the Applicant has already also proposed (see European patent application EP 1 344 900 A2) a different solution in which the piston 21 controlling the intake valve of the engine is without an end prong and the one-way valve 32 instead of being located in the body of the piston 21 is located in a fixed part. Furthermore, one or more passages communicating directly with the pressure chamber C have their outlets in the wall of the bush within which the piston 21 is mounted in a sliding manner. These passages are shaped and positioned in such a manner that they are progressively intercepted by the piston 21 in the final phase of closure of the engine valve, in order to cause a restriction of the section of fluid passage, with a consequent hydraulic braking effect. Furthermore, in the solution proposed in application for European patent EP 1 344 900 A2, an auxiliary hydraulic tappet is situated between the piston 21 that controls the engine valve and the stem of the engine valve.

In order to illustrate another significant example of application, already proposed by the same Applicant, FIG. 2 of the attached drawings shows the embodiment forming the subject of the prior application for a European patent EP 1 653 057 A1 by the same Applicant. In this case the engine is provided with a single camshaft to control both the intake valves and the exhaust valves.

With reference to FIG. 2, all the members of the electronically-controlled hydraulic device are carried by a single "brick" structure 200 that has a lower plane that, in the assembled condition, corresponds to the plane passing through the axes of two shafts 11, 28. The shaft 11 is the sole camshaft of the engine and is thus provided both with cams to control the intake valves and with cams to control the exhaust valves of the engine, whereas the shaft 28 is a shaft without cams having one extremity coming out of the cylinder head bearing a power takeoff that can be exploited to operate any auxiliary system.

Similarly to a conventional engine, the two shafts 11, 28 have extremities likewise external to the cylinder head bearing gears 202, 203 which are to engage with the gearing chain that transmits motion from the driving shaft to the shafts 11, 28.

The shaft 11, as discussed above, is provided with both cams operating the engine intake valves and cams operating the exhaust valves. According to a solution already proposed in EP 1 555 398 A1 by the same Applicant, the cams controlling the intake valves control them through an electronically-controlled hydraulic device of a type similar to that described with reference to FIG. 1. In FIG. 2, the parts of said device are indicated with the same reference numbers used in FIG. 1. Vice versa, the exhaust valves are operated mechanically by the respective cams of the shaft 11. As is clear in FIG. 2, the exhaust valves are operated by rocker arms 204, each of which has one extremity 205 pivoted to the cylinder head structure, an intermediate roller making contact with the respective cam, and the opposite extremity 206 that operates the respective exhaust valve 70. The pumping element 16 associated to each intake valve is, on the contrary, controlled by a rocker arm 207 pivoted to the "brick" structure 200 and that has portions engaging respectively with the controlling cam carried by the shaft 11, and with the pumping element 16. FIG. 2 also shows the sparking plug 208 (and the relative coil 209) associated to the cylinder of the engine. As has been said, the "brick" bears all the elements making up the electronically-controlled hydraulic device for the variable operation of the intake valve 7, as well as all the ducts of the hydraulic system associated to that device.

SUMMARY OF THE INVENTION

The purpose of the present invention is to further improve the valve operating systems previously proposed by the same Applicant, in order to enable further advantages to be achieved in terms of engine running, particularly in terms of better performance and/or lower consumption and/or reduction of pollutants in the exhaust, both in the case of petrol engines and in the case of diesel engines.

The main characteristic of the invention lies in the fact that the cam controlling each intake valve is shaped in such a manner as to generate a lift profile of the intake valve including a boot portion with a substantially constant lift.

As will be clear below, the combination of providing for a cam controlling the intake valve having this characteristic with a variable operating system of the valve of the type described above opens the way to a series of significant improvements and operating advantages both in the case of petrol engines and in the case of diesel engines.

In the case of a petrol engine, the said boot portion with substantially constant lift in the intake valve lift profile is provided in the initial part of the intake valve lift cycle, and in advance of the top dead centre (TDC) of the piston of the respective cylinder. Furthermore, in the case of this application, the electronic means of control of the operating system of the intake valve are programmed to maintain said solenoid valve closed when the speed of rotation of the engine is below a preset value.

In this way, when the speed of the engine is relatively low, and in any case below said preset value, the lift profile of the intake valve is solely determined by the profile of its controlling cam. As indicated, this cam profile is such as to generate a substantially constant lift boot portion in the valve lift profile, which is in advance of the top dead centre. This causes an overlap of the exhaust phase with the subsequent intake phase of the engine, since the intake valve, opening in advance of the top dead centre, is already open in the final part of the prior exhaust phase.

Opening of the intake valve in the final part of the exhaust phase causes a "scavenging" action of the combustion chamber since the higher pressure existing in the intake manifold (particularly in the case of a supercharged engine) with respect to the pressure existing in the exhaust manifold causes an increase in the mass of air sucked into the cylinder.

The above application of the invention is particularly indicated in the case of a supercharged petrol engine with direct injection of petrol into the cylinder, since direct injection avoids the risk of unburnt petrol being sent directly into the exhaust manifold during the simultaneous opening of the intake and exhaust valves, this risk on the contrary not being negligible in the case of petrol being injected into the intake manifold.

Again in the case of the above application, at high engine speeds, the electronic means controlling the solenoid valve is capable of maintaining the solenoid valve open in the phase preceding the TDC, in such a manner that the first part of the profile of the cam becomes ineffective and the intake valve remains closed substantially up to the TDC. At such high speeds, indeed, an extensive overlap of the phases of intake and exhaust is unfavourable for engine performance.

It must also be noted that engines having a first camshaft controlling the intake valves and a second camshaft to control the exhaust valves have already be proposed, in which means are provided to vary the angular phase of each camshaft with regard to the drive shaft, that makes it possible to vary the extent of the exhaust and intake phase overlap as a function of engine speed. With respect to these systems, the system according to the invention guarantees the advantage of achieving the same result in an engine having a single camshaft to control the intake and exhaust valves, like that illustrated in FIG. 2.

Again in the case of the above embodiment of the invention applicable to a petrol engine, the constant lift boot comprising part of the intake valve lift profile has a height not above one-quarter of the maximum lift of the valve. Furthermore, this constant lift boot extends for an angle of not less than 40° of the rotation of the engine shaft before the top dead centre (TDC).

It must further be noted that where, in the present description and in the attached claims, the expression "substantially constant lift boot" is used it is intended to include both the case of a portion of the valve lift cycle in which the height of the valve remains rigorously constant, and the case in which this height does not vary in any case by more than 0.2 mm/rad.

Further characteristics and advantages of the above embodiment of the invention for application to a petrol engine will be illustrated below.

In a second embodiment of the invention, which is to be applied to a diesel engine, the said boot with substantially constant lift is provided in the final part of the intake valve lift cycle, after the BDC, and extends for an angle of rotation of the engine shaft of not less than 40° and not more than 100° after the BDC.

Preferably, this constant lift boot has a height not above ⅓ of the maximum lift of the valve.

Also in the case of this second embodiment, the electronic control means are programmed to maintain the solenoid valve controlling the intake valve in a closed condition in specific running conditions of the engine, so that in these conditions, the intake valve has a lift profile corresponding to the profile of its controlling cam, said constant lift boot being in the final part of the valve opening cycle. In other operating conditions of the engine, on the contrary, the electronic means of control keep the solenoid valve controlling the intake valve open, so that said final part with constant lift boot may be reduced in time, or entirely excluded, in which case the engine operates like a conventional engine.

The solenoid valve is regulated in such a manner that the constant lift boot has a duration varying between 40° and 100° after the BDC, in the partial load zones of the engine and at medium-to-low speeds, in which pollutant emissions are of greater weight in actual utilisation of the engine.

At higher engine loads, the solenoid valve is regulated such as to exclude the constant lift boot, in order to maximise filling of the cylinder.

When the constant lift boot is activated, advantages are obtained in terms of reduction of pollutants in the engine exhaust. Indeed, extending the final part of the intake valve opening cycle with a constant lift boot causes markedly delayed closing of the intake valve with regard to the bottom dead centre (BDC) of the piston of the respective cylinder which causes, during lifting of the piston, a part of the air sucked in during the intake phase to be pushed out through the intake conduit. This gives rise to a reduction in the effective compression ratio, whose consequence is a reduction in the emission of smoke and nitrogen oxides at the exhaust.

It is particularly important to note that the profile of the cam controlling the intake valve according to this second embodiment of the invention, if combined with a traditional valve control, would give rise to severe disadvantages in engine running. Indeed, due to the high reflux of air into the intake conduit, which would always be present in its maximum extent, a difficulty would be caused in starting the engine, together with a drastic reduction in engine performance and an unacceptable increase in pollutant emissions at the exhaust. The combination of a cam having the profile defined above, combined with a variable valve operating system, again described above, enables the duration in time of the constant lift boot in the opening cycle of the intake valve, subsequent to the bottom dead centre, to be graduated from zero to a maximum value.

BRIEF DESCRIPTION OF THE DRAWINGS

Further characteristics and advantages of the second embodiment, as likewise those of the above first embodiment, will appear in the description that follows with reference to the attached drawings, provided as a simple example without limiting intent, in which:

FIG. 3 of the attached drawings shows, as an example, the intake and exhaust valve lift diagrams in an engine according to the prior art of the type including a first camshaft to control the intake valves, a second camshaft to control the exhaust valves, and phase variation devices of the two camshafts that enable the degree of overlap between the intake and exhaust phases to be varied as the speed of the engine varies. In spark-ignition engines, particularly supercharged engines and those entailing the direct injection of petrol into the combustion chamber, it is already known that extensive areas of superimposition between the lift of the exhaust valve and the lift of the intake valve can be exploited (diagrams S1 and A1 in FIG. 3) in order to obtain, at low engine speeds and at high loads, an increased mass of air sucked into the cylinder, exploiting the favourable pressure difference between the intake manifold and the exhaust manifold, that in these conditions is favoured by the supercharging, so as to obtain a scavenging effect. As already indicated, this manner of operation is particularly indicated in engines providing for the direct injection of petrol into the cylinder, since this avoids having unburnt petrol sent into the exhaust manifold, which would occur in the case of injection into the intake manifold.

Figure 3:
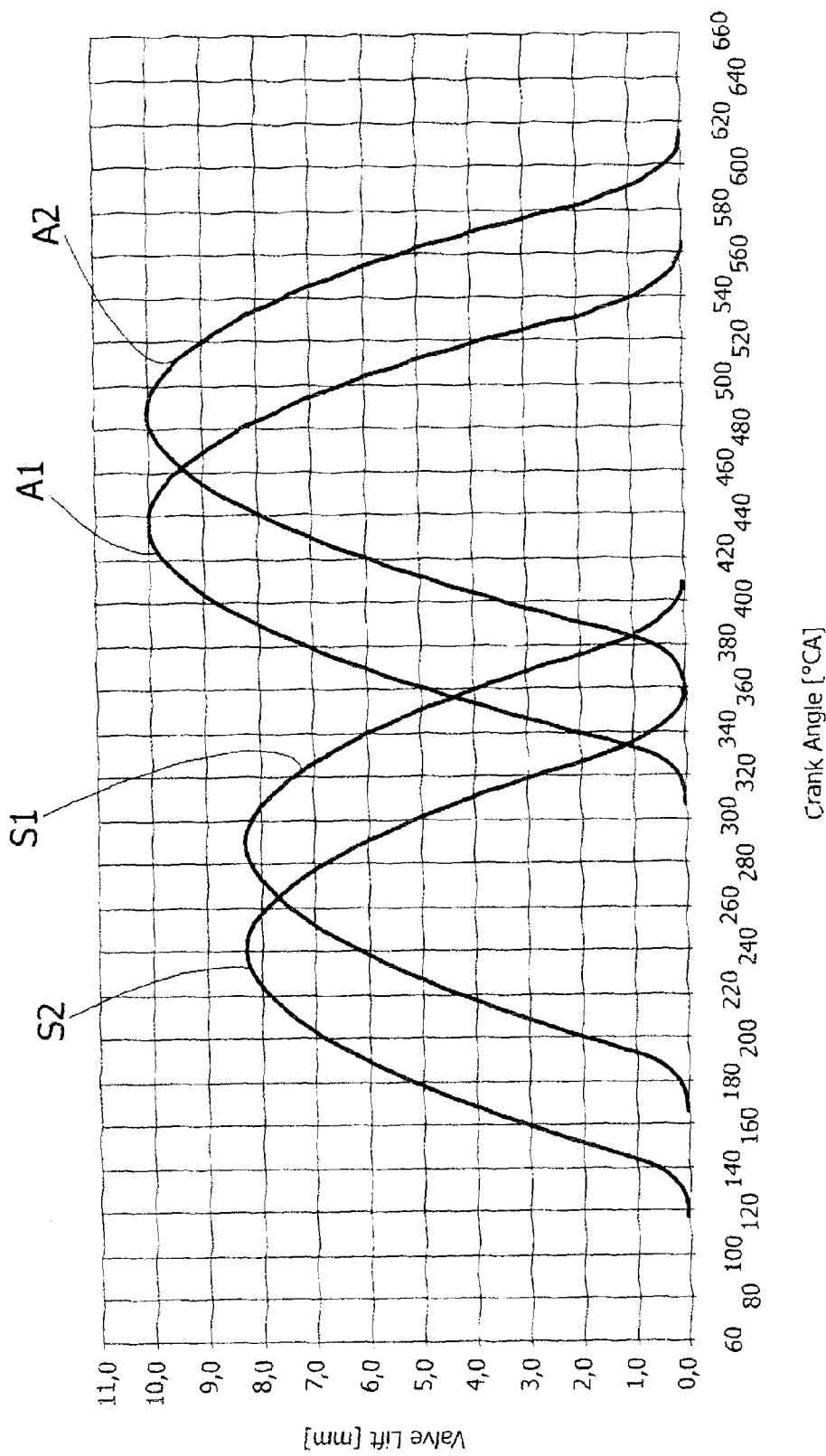
FIG. 3 shows, in diagram form, the variation in lift of the intake and exhaust valves in a traditional engine with two camshafts to control the intake valves and the exhaust valves, provided with phase variation devices.

At higher engine speeds, at which an extensive overlap of the exhaust and intake valves is unfavourable to performance, phase variation devices are activated (devices that enable the angular position of the camshaft to be regulated for the same position of the drive shaft) in such a manner as to reduce valve lift superimposition (diagrams S2, A2 in FIG. 3).

Figure 4:
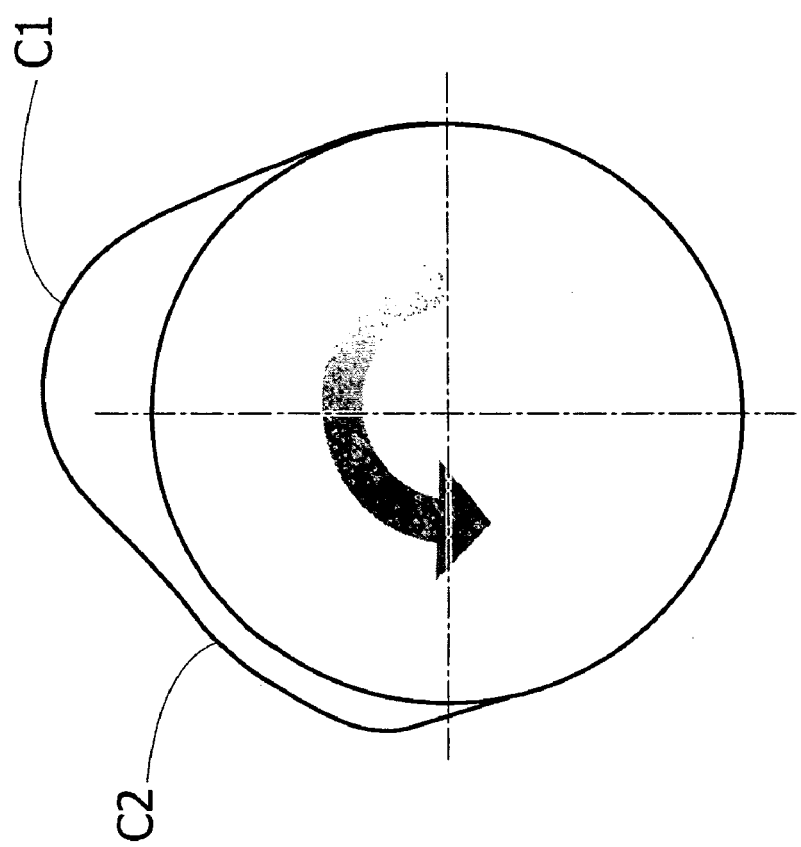
FIG. 4 shows an example of an intake cam provided in an engine according to a first embodiment of the present invention.

In the first embodiment of the present invention, said "scavenger" effect, that can already be obtained with conventional engines, is achieved through the combination of a variable valve actuation system of the type described above with the use of cams controlling the intake valves having the profile shown in diagram form in FIG. 4. In that figure, the profile is illustrated with reference to an anticlockwise direction of rotation of the cam. As may be seen, the portion C1 of the profile of the cam that produces the intake valve lift presents a boot portion C2, with substantially constant lift, in the initial part of the valve lift cycle.

Figure 5:
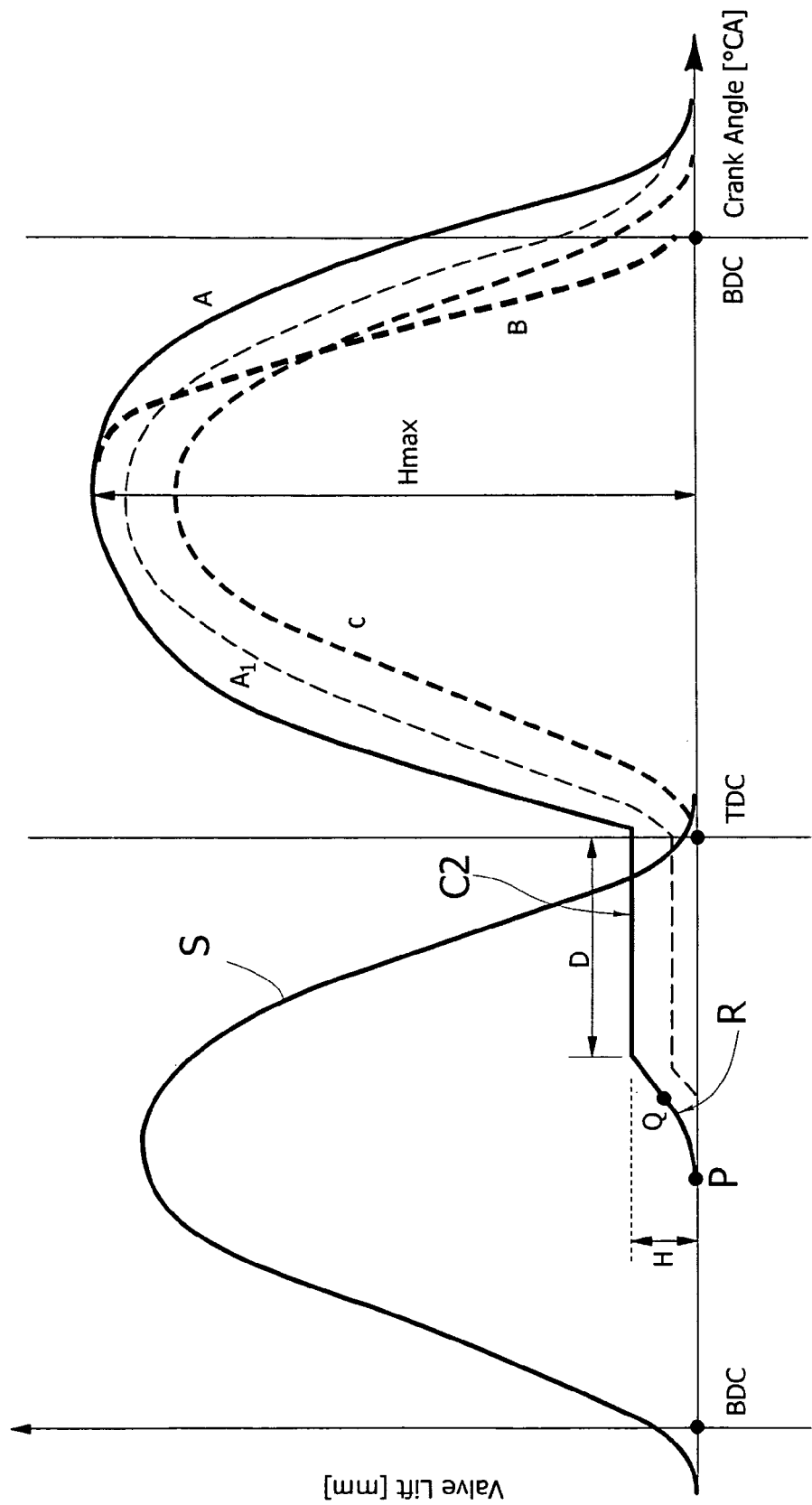
FIG. 5 shows, in diagram form, the operating principle of said first embodiment of the invention.

FIG. 5 of the attached drawings shows, with A, the intake valve lift profile produced by the cam illustrated in FIG. 4. According to the invention, this cam is used in combination with traditional cams to operate the exhaust valves, which produce a traditional lift profile for the exhaust valves, indicated with S in FIG. 5.

As is clear in FIG. 5, in the case of the first embodiment of the invention, the lift profile A of the intake valve presents in its initial part a boot portion C2 that extends for an angle D before the position of the engine angle corresponding to the top dead centre (TDC) of the piston in its respective cylinder.

As was already indicated above, at low engine speeds and high loads, where the favourable pressure difference between intake and the exhaust due to supercharging can be exploited, the solenoid valve controlling the intake valve is kept closed, so that the boot C2 of the cam is made effective, thus creating a wide phase overlap with the exhaust valve that causes the "scavenging" effect described above and the consequent increase in the mass of air introduced into the cylinder. Activation of the boot C2 is achieved by closing the solenoid valve of the valve operating system before point P in the diagram in FIG. 5.

Naturally, thanks to the predisposition of the variable valve operating system, the final part of the intake valve opening cycle may be that illustrated in diagram A, or may terminate in advance, as illustrated by the line B (all profiles included between A and B are possible, thanks to an appropriate control of the solenoid valve controlling the intake valve).

At higher engine speeds, where an excessive overlap between exhaust and intake valves would be counter-productive, the lift of the intake valve indicated with C is activated. In this case, therefore, the solenoid valve is kept open throughout the angular field that precedes the TDC, so as to completely exclude the constant lift boot C2.

Furthermore, it is also possible to keep the solenoid valve open for a certain angular field subsequent to point P in FIG. 5 and then close it in any case in advance with respect to the TDC, so as to give rise for example to a lift profile of the type indicated with A1 in FIG. 5.

Figure 1:
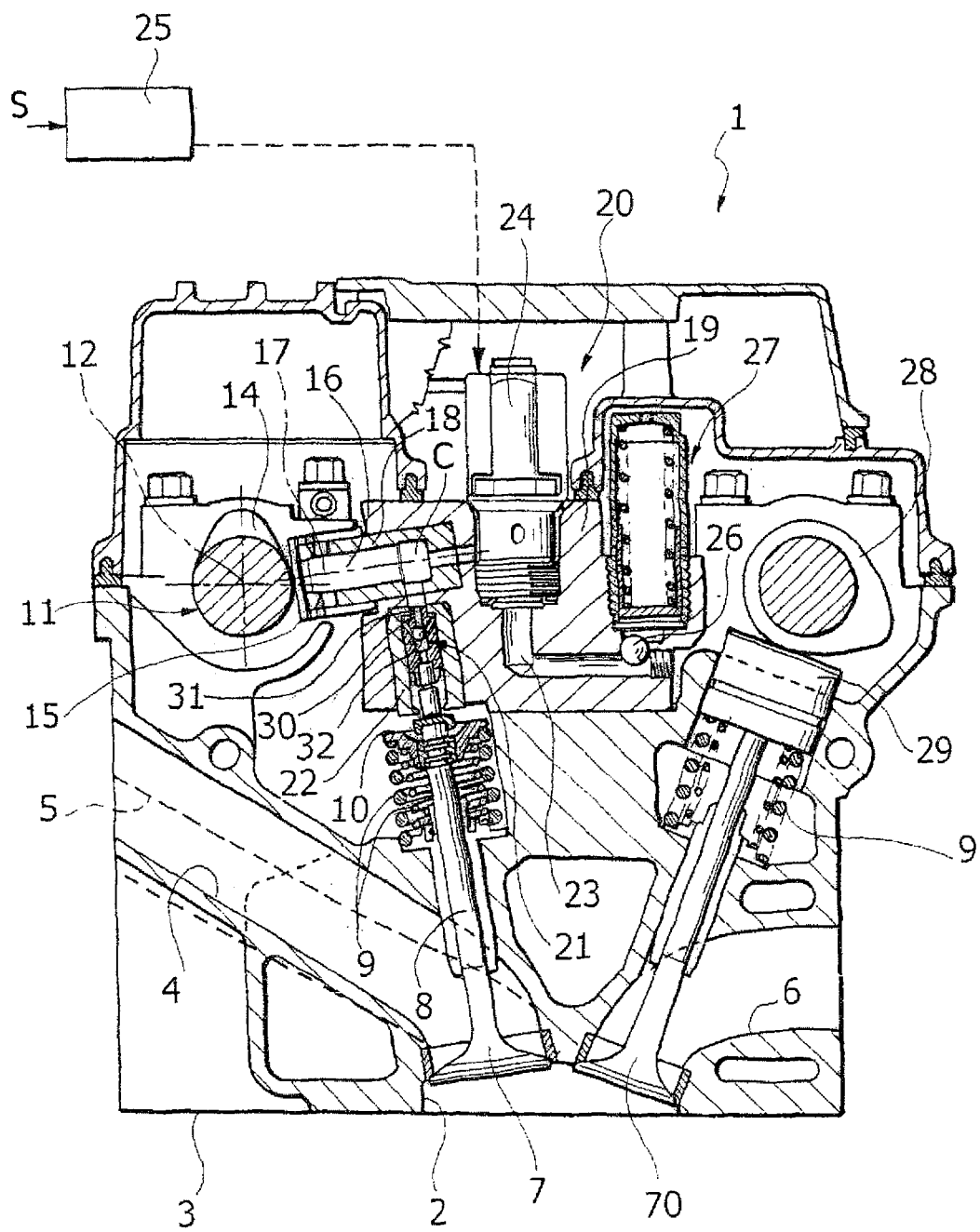
FIG. 1 shows a cross-section of an engine according to the prior art, of the type described for example in European patent EP 0 803 642 B1 of the Applicant, that is shown here to illustrate the fundamental principles of a variable actuation valve system of the type already proposed by the Applicant.
Figure 2:
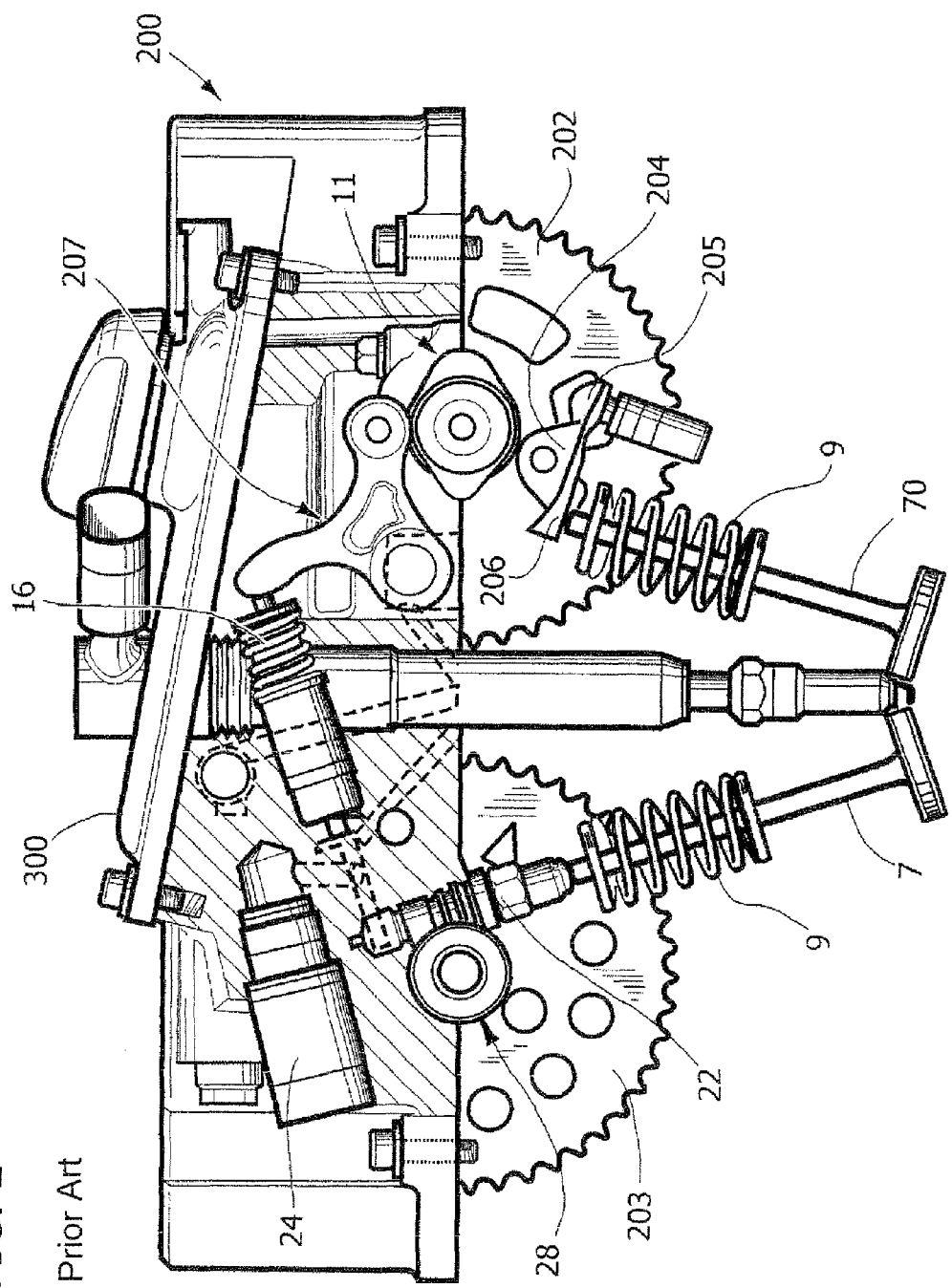
FIG. 2 shows a cross-section of a further application of the system previously proposed by the same Applicant, as illustrated in European patent application EP 1 653 057 A1, mainly characterised in that it provides for a single camshaft to control the intake valves and the exhaust valves.

Naturally, it is the geometry of the cam illustrated in FIG. 4 that determines the lift H and the duration D illustrated in FIG. 5. This geometry is naturally optimised depending on the application. In any case, for preference H is not higher than one quarter of the maximum intake valve lift ($H_{max}$ in FIG. 2), and D must not be less than 40° of the engine angle, to allow the solenoid valve sufficient time to close in the constant lift zone at high engine speeds.

As was already said, the boot C2 may be rigorously of constant lift H, or in any case may have a lift variation not above 0.2 mm/radio.

In the engine control described above, it is nevertheless important to ensure that the solenoid valve closes before the steep part of the profile A, since otherwise at high speeds there would be marked pressure peaks in the fluid (typically the engine lubrication oil) in the pressure chamber of the valve control system. These peaks (water hammers) might damage the system and compromise control of the valve.

It is likewise important that the approach ramp indicated with R in FIG. 5 has a slope of less than 2 mm/rad., for two reasons:
- to limit the inertial emptying of the pressure chamber of the valve operating system at high speeds, when the solenoid valve is closed on the part at constant lift of duration D, to ensure the regularity of the successive lift C;
- to control continuously, at low engine speeds, both the quantity of air trapped during scavenging at high loads, and the quantity of burnt gases recircled internally at partial loads (see for example the closure of the solenoid valve at point Q and the consequent lift $A_1$ in FIG. 5).

Figure 6:
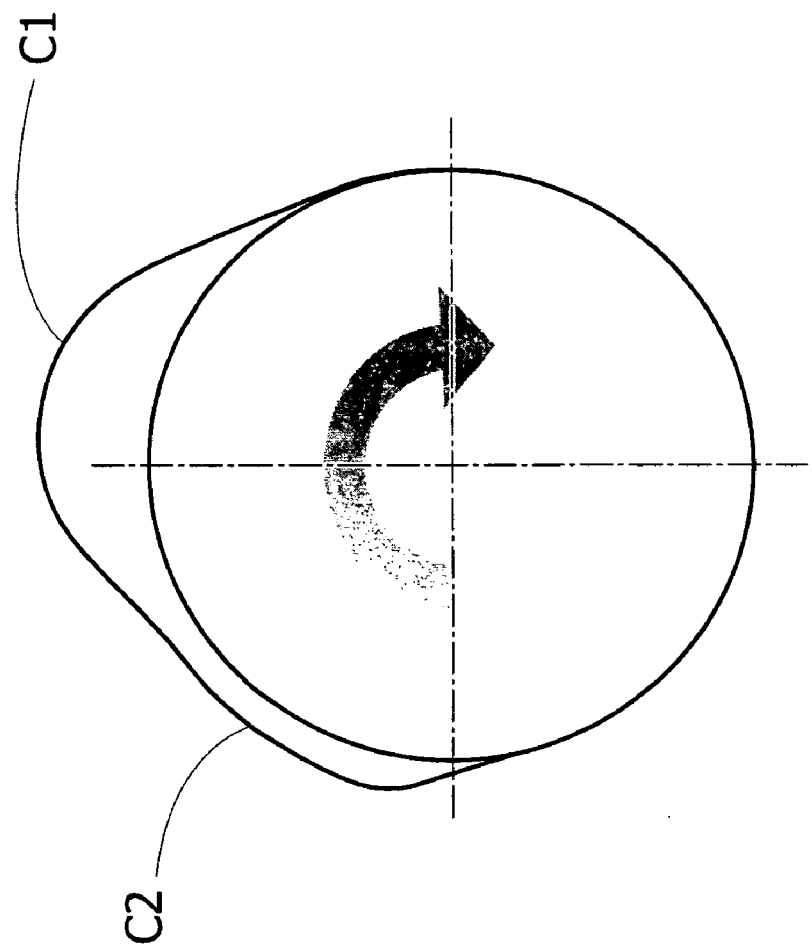
FIG. 6 shows, in diagram form, the profile of the cam controlling the intake valve according to what is provided for in the second embodiment of the present invention.
Figure 7:
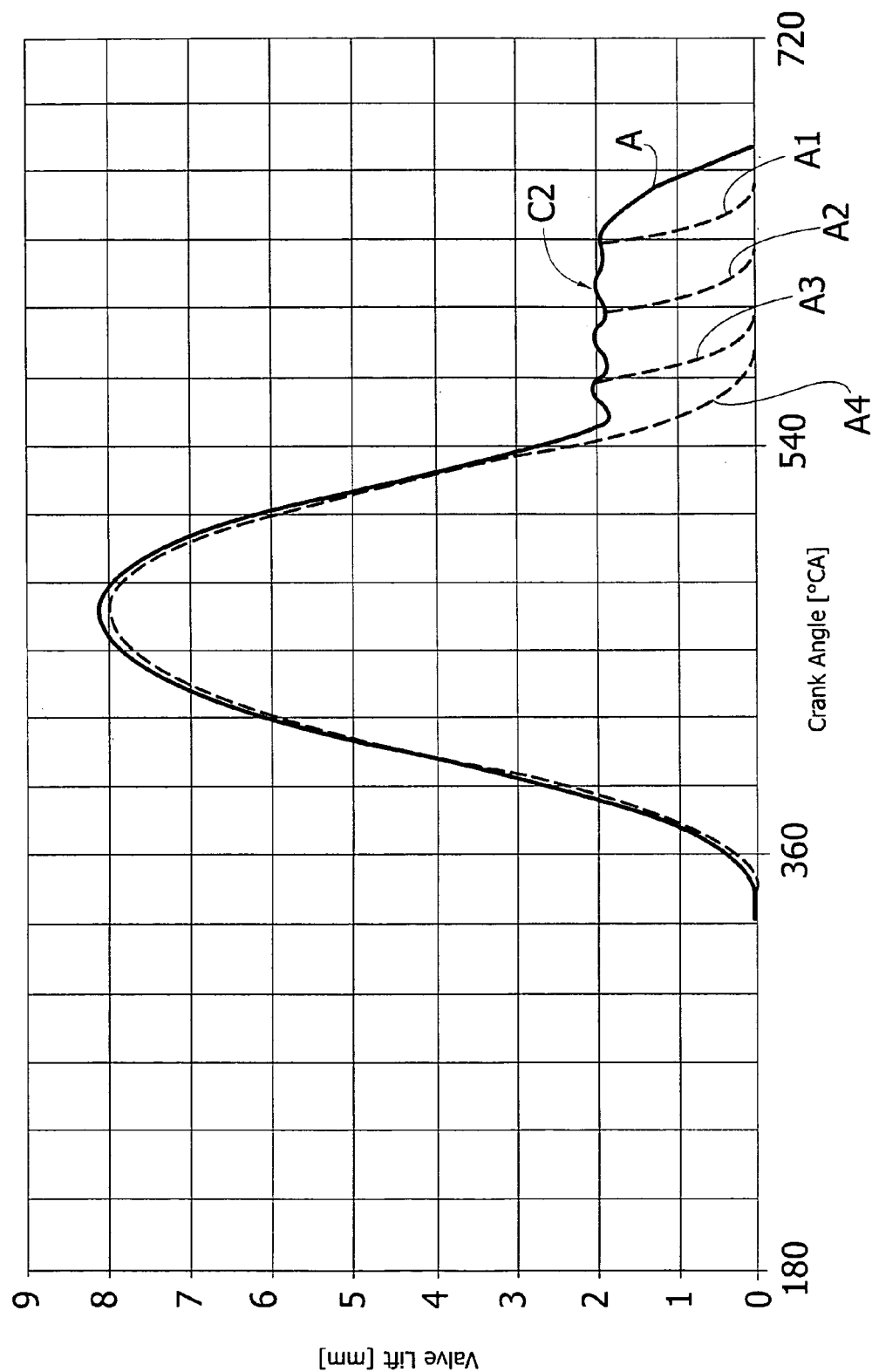
FIG. 7 shows the operating principle of the second embodiment of the invention.

In a second embodiment of the invention, to be applied to a diesel engine, the cams controlling the intake valves present the profile indicated in diagram form in FIG. 6 (with reference to a clockwise rotation of the camshaft), so as to generate an intake valve lift profile of the type shown in FIG. 7.

In modern compression ignition engines, one of the most significant challenges is to meet the increasingly strict European regulations that limit the emission of pollutant substances (EURO IV, EURO V). These standards severely limit the maximum permissible quantities of particulates (smoke) and nitrogen oxides ($NO_x$) emitted during a standard and approved test cycle. The fuel used for diesel engines (oil) is much less volatile than petrol and enters the combustion chamber towards the end of the compression phase. It thus has little time to vaporise and mix with the air that has been sucken in. Production of smoke comes about when some drops of fuel (the largest drops) are unable to completely vaporise during combustion and enter the exhaust in the form of small particles of carbon, or when the conditions of the mixture of air and diesel fuel, in the form of vapour, are locally too rich. The production of $NO_x$ is higher when combustion comes about at very high temperatures.

Various methods have been studied to reduce these types of pollutant emissions: the use of very high injection pressures, to guarantee better pulverisation of the fuel, exhaust gas recirculation (EGR) into the intake to reduce the combustion temperature, use of particle traps, reduction of the geometric compression ratio, and others. These systems have given good results, but the regulations will be ever more stringent in the future and it is therefore necessary to design new strategies to further reduce emissions.

The second embodiment of the invention was developed in this light, so as to enable marked improvements in limiting the emission of smoke and $NO_x$ and in diesel engines. The concept is based on the reduction of the effective compression ratio through using a cam of the type illustrated in FIG. 6, in combination with a variable operation system of the type already proposed by the Applicant.

According to this second embodiment, the cam controlling the intake valves is such as to generate a substantially constant lift boot in the final part of the valve lift cycle (FIG. 7), such as to cause the intake valves to close with a marked delay with regard to the bottom dead centre (BDC) of the piston in the respective cylinder. In this manner, when the piston rises, part of the air sucked in during the intake phase is pushed out, and made to return into the intake conduit. As may be seen, the cam delays closure of the intake valve, maintaining the lift practically constant at a preset value, for a minimum duration of 40° of the engine angle, up to a maximum value of 100° of the engine angle. Research and experiments performed by the Applicant have shown that a duration above 100° does not offer further benefits.

In FIG. 7, diagram A indicates the valve lift profile produced by a cam having the geometry illustrated in FIG. 6, when the solenoid valve of the valve operating system is maintained closed. As the engine operating conditions vary, the part of the diagram comprising the boot C2 at constant lift may be reduced in duration (profiles A1, A2, A3) opening the solenoid valve of the operating system at the required time, or it may be completely eliminated (diagram A4).

The longer the delay in closing the valve, the lower is the effective compression ratio obtained, and the greater the air reflux. Thanks to the variable valve operating system, it is however possible to graduate this effect and even to return to the conventional profile $A_4$ when it is required to operate with a higher compression ratio.

It is important to note that a cam like that illustrated in FIG. 6 could not be used in an engine provided with a traditional valve operating system. Indeed, in that case there would be severe disadvantages for the running of the engine, since due to the high reflux of air, always present at its maximum extent, there would be difficulty in starting the engine, a drastic reduction in engine performance, and an unacceptable increase in pollutant emissions. On the contrary, the combination of a cam of the type illustrated in FIG. 6 with a variable valve operating system of the type described above enables the reflux effect to be appropriately regulated so as to adapt it to the engine operating conditions.

As already indicated, by effect of the delayed closure of the intake valve, the air that remains in the cylinder effectively begins to be compressed only after this closure. A reduction in the effective compression ratio is therefore obtained that leads to a reduction in pressure and to a reduction in temperature at the instant in which the fuel is injected, with regard to the values that would be obtained in a conventional engine. The reduced pressure and temperature values cause an increased ignition delay, that is an increase in the time span between the instant at which the fuel is injected and the instant at which it begins to burn. The fuel therefore has more time available to vaporise and mix with the air, reducing the emission of smoke in the exhaust.

Thanks to the reduction of emission of particulate (which raises the engine's "soot limit") it is therefore possible to increase the extent of exhaust gas recirculation (EGR) so as to reduce nitrogen oxides. Gases that are recirculated with the EGR system constitute an additional mass that does not take part in combustion and has the effect of causing the combustion pressure to rise, however causing a further lowering of the mean temperature, since the heat produced by the burning of the fuel is shared through a greater mass. This lowering of the mean temperature of combustion reduces the formation of nitrogen oxides ($No_x$). In conclusion, use of a cam having the profile illustrated in FIG. 6 in combination with the variable valve operating system enables the beneficial effects described above to the regulated in an optimal manner as engine running conditions change, to obtain the maximum reduction of the emission of smoke and of nitrogen oxides.

Naturally, the principle of the invention remaining the same, construction details and embodiments may be widely varied with regard to what is described and illustrated as a simple example, without thereby departing from the scope of the present invention.

What is claimed is:

1. A multi-cylinder internal combustion engine, including:
   at least one intake valve and at least one exhaust valve for each cylinder, each provided with respective biasing spring means that bias the valve to a closed position, to control the respective intake and exhaust conduits,
   at least one camshaft, to operate the intake valves and the exhaust valves of the cylinders of the engine through respective tappets,
   in which at least each intake valve is of the variable actuation type, by being controlled by a respective tappet, against the action of said biasing spring means, through the interposition of hydraulic means including a chamber of fluid under pressure, facing a pumping piston connected to the tappet of the valve,
   said chamber of fluid under pressure being adapted to be connected through a solenoid valve with a discharge channel, for the purpose of uncoupling the variable actuation valve from the respective tappet and causing the rapid closing of the valve under the action of the respective biasing spring means,
   electronic control means to control each solenoid valve so as to vary the time and extension (lift) of opening of the variable actuation valve as a function of one or more operating parameters of the engine,
   wherein the cam controlling each intake valve is shaped so as to generate a valve lift profile including a boot portion with substantially constant lift,
   wherein the engine is a supercharged petrol engine and wherein said boot portion of substantially constant lift is provided in the initial part of the intake valve lift cycle, in advance with regard to the top dead centre of the piston of the respective cylinder.

2. The engine according to claim 1, wherein said electronic control means are adapted to maintain said solenoid valve closed during said initial part of the intake valve lift cycle, such as to make said boot portion effective when the speed of rotation of the engine is below a preset threshold value.

3. The engine according to claim 1, wherein said constant lift of said boot portion is equal to at least one quarter of the maximum lift of the intake valve.

4. The engine according to claim 1, wherein said boot portion of constant lift covers an angle of at least 40° of the rotation of the drive shaft before the TDC.

5. The engine according to claim 1, wherein said boot portion presents a lift variation of less than 0.2 mm/rad.

6. A multi-cylinder internal combustion engine, including:
   at least one intake valve and at least one exhaust valve for each cylinder, each provided with respective biasing spring means that bias the valve to a closed position, to control the respective intake and exhaust conduits, at least one camshaft; to operate the intake valves and the exhaust valves of the cylinders of the engine through respective tappets, in which at least each intake valve is of the variable actuation type, by being controlled by a respective tappet, against the action of said biasing spring means, through the interposition of hydraulic means including a chamber of fluid under pressure, facing a pumping piston connected to the tappet of the valve, said chamber of fluid under pressure being adapted to be connected through a solenoid valve with a discharge channel, for the purpose of uncoupling the variable actuation valve from the respective tappet and causing the rapid closing of the valve under the action of the respective biasing spring means, electronic control means to control each solenoid valve in such a manner as to vary the time and extension (lift) of opening of the variable actuation valve as a function of one or more operating parameters of the engine, wherein the cam controlling each intake valve is shaped in such a manner as to generate a valve lift profile including a boot portion with substantially constant lift, wherein the engine is a diesel engine and wherein said boot portion at substantially constant lift is provided in the final part of the intake valve lift cycle, after the BDC.

7. The engine according to claim 6, wherein said boot portion covers an angle of rotation of the drive shaft of not less than 40° and not more than 100° after the BDC.

8. The engine according to claim 6, wherein said constant lift of said boot portion is not greater than one-third of the maximum lift of the valve.

9. The engine according to claim 6, wherein said boot portion presents a lift variation not more than 0.2 mm/rad.

* * * * *